United States Patent
Zwanzger et al.

(10) Patent No.: US 11,059,339 B2
(45) Date of Patent: Jul. 13, 2021

(54) SYSTEM FOR PREDICTIVE CHASSIS CONTROL FOR AN OFF-ROAD UTILITY VEHICLE

(71) Applicant: Deere & Company, Moline, IL (US)

(72) Inventors: Matthias Zwanzger, Jehlfeld (DE); Mattias Lang, Gaiberg (DE); Christian Von Holst, Hettenleidelheim (DE)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 15/560,080

(22) PCT Filed: Mar. 17, 2016

(86) PCT No.: PCT/EP2016/055852
§ 371 (c)(1),
(2) Date: Sep. 20, 2017

(87) PCT Pub. No.: WO2016/150820
PCT Pub. Date: Sep. 29, 2016

(65) Prior Publication Data
US 2018/0079271 A1 Mar. 22, 2018

(30) Foreign Application Priority Data
Mar. 23, 2015 (DE) .................. 102015205210.9

(51) Int. Cl.
*B60G 17/0165* (2006.01)
*B60G 17/06* (2006.01)
(Continued)

(52) U.S. Cl.
CPC ......... *B60G 17/0165* (2013.01); *B60G 13/08* (2013.01); *B60G 17/018* (2013.01);
(Continued)

(58) Field of Classification Search
CPC ............ B60G 17/0152; B60G 17/0165; B60G 17/018; B60G 17/08
See application file for complete search history.

(56) References Cited

U.S. PATENT DOCUMENTS

| 2004/0094912 A1* | 5/2004 | Niwa | B60G 17/0165 |
| | | | 280/5.518 |
| 2005/0085998 A1* | 4/2005 | Bless | G08G 1/096775 |
| | | | 701/533 |

(Continued)

FOREIGN PATENT DOCUMENTS

| DE | 10052787 A1 | 9/2001 |
| DE | 102009054460 A1 | 6/2011 |

(Continued)

OTHER PUBLICATIONS

The International Search Report and the Written Opinion of the International Searching Authority issued in counterpart application No. PCT/EP2016/055852, dated Jun. 3, 2016 (11 pages).

(Continued)

*Primary Examiner* — Imran K Mustafa
(74) *Attorney, Agent, or Firm* — Taft Stettinius & Hollister LLP; Stephen F. Rost

(57) ABSTRACT

A system for predictive chassis control including a wheel-spring device controllable with respect to a damping or suspension characteristic, a sensor for ascertaining a force profile of a disturbance acting on the wheel-spring device, and a navigation for ascertaining a current geoposition of the off-road utility vehicle in the form of an associated position data. The system includes a memory unit and a control unit for saving the force profile induced by the disturbance or a quantity derived therefrom. The control unit detects an imminent renewed crossing of the disturbance by continuous reconciliation of the current geoposition received from the navigation with the saved position data. The control unit (Continued)

adapts the damping or suspension characteristic on the basis of the saved force profile or the quantity derived therefrom by a pilot control of the wheel-spring device to compensate for an influence of the disturbance on the wheel-spring device.

12 Claims, 1 Drawing Sheet

(51) Int. Cl.
  *B60G 17/02* (2006.01)
  *B60G 17/015* (2006.01)
  *B60G 17/018* (2006.01)
  *B60G 17/08* (2006.01)
  *B60G 13/08* (2006.01)

(52) U.S. Cl.
  CPC ......... *B60G 17/0152* (2013.01); *B60G 17/02* (2013.01); *B60G 17/06* (2013.01); *B60G 17/08* (2013.01); *B60G 2400/821* (2013.01); *B60G 2401/16* (2013.01); *B60G 2500/10* (2013.01); *B60G 2500/20* (2013.01); *B60G 2600/182* (2013.01); *B60G 2800/162* (2013.01)

(56) References Cited

U.S. PATENT DOCUMENTS

| | | |
|---|---|---|
| 2009/0164063 A1 | 6/2009 | Piccinini et al. |
| 2012/0203428 A1* | 8/2012 | Choi ...................... B60G 17/08 701/37 |
| 2014/0002277 A1* | 1/2014 | Fulger .............. G08G 1/096775 340/905 |
| 2016/0236689 A1* | 8/2016 | Pettersson ............... B60T 8/172 |

FOREIGN PATENT DOCUMENTS

| | | |
|---|---|---|
| DE | 102012017118 A | 5/2014 |
| EP | 1 288 887 A2 | 5/2003 |
| FR | 3 007 327 A1 | 6/2013 |
| WO | 2014051890 A1 | 4/2014 |

OTHER PUBLICATIONS

German Search Report; German Patent Application No. 102015205210.9; dated Nov. 10, 2015; 18 pages.

European Office Action; European Patent Application No. 16711578.1; dated May 4, 2020; 9 pages.

* cited by examiner

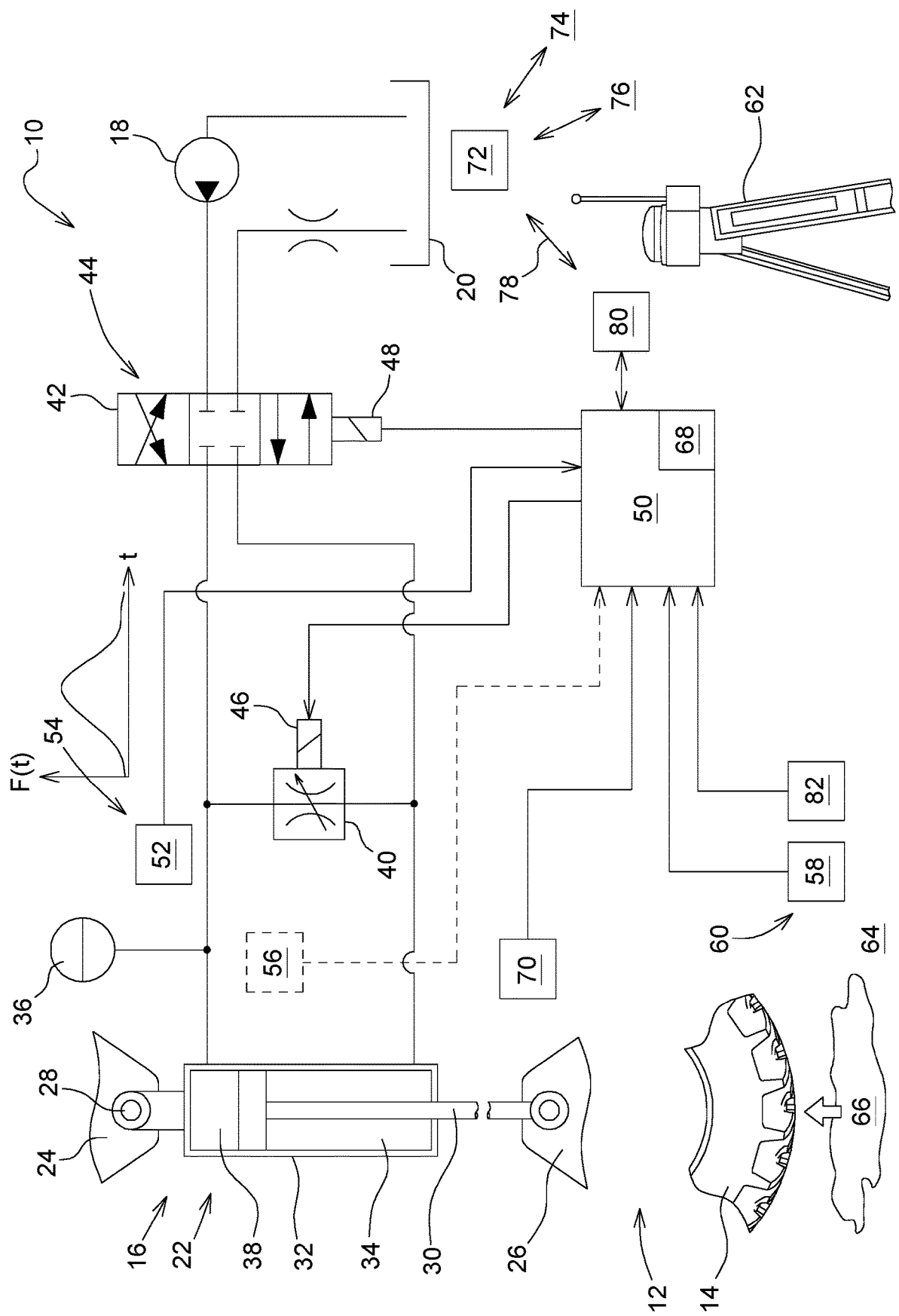

SYSTEM FOR PREDICTIVE CHASSIS CONTROL FOR AN OFF-ROAD UTILITY VEHICLE

RELATED APPLICATIONS

This application claims the benefit of International Patent Application PCT/EP2016/055852, filed Mar. 17, 2016, which claims priority to German Application Ser. No. 102015205210.9, filed Mar. 23, 2015, the disclosures of which are hereby expressly incorporated by reference in their entirety.

FIELD OF THE DISCLOSURE

The present disclosure relates to a system for predictive chassis control for an off-road utility vehicle.

BACKGROUND

A system for predictive chassis control are known, in particular, from the automobile industry. For instance, a system for optimizing the handling of a motor vehicle equipped with an adaptive chassis is disclosed in German patent application DE 10 2012 017 118 A, in which a topographical profile of a roadway surface situated ahead in the direction of travel is captured for the purpose of predicting a motion behavior to be expected of the motor vehicle. The system further adapts a damping behavior of the chassis and looks ahead on the basis of the motion behavior to be expected. The capture of the roadway surface situated ahead is undertaken by using imaging sensors such as, for example, a laser scanner, a mono camera, or a stereo camera. Due to the image processing to be carried out, the known system can only be realized with significant technical effort.

It is therefore desirable for a simplified system for predictive chassis control for an off-road utility vehicle.

SUMMARY

In one embodiment of the present disclosure, a system for predictive chassis control for an off-road utility vehicle includes a wheel-spring device which is controllable with respect to a damping characteristic or suspension characteristic, a sensor means for ascertaining a force profile of a disturbance acting on the wheel-spring device by reason of a condition of a ground surface to be driven along, a navigation means for ascertaining a current geoposition of the off-road utility vehicle in the form of associated position data, and also a memory unit in which a control unit saves the force profile brought about by reason of the disturbance, or a quantity derived therefrom, inclusive of the position data corresponding thereto, as an associated data pair. The control unit detects by continuous reconciliation of the current geoposition, made available by the navigation means, of the off-road utility vehicle with the saved position data, an imminent renewed crossing of the disturbance and adapts the damping characteristic or suspension characteristic, on the basis of the saved force profile or on the basis of the quantity derived therefrom, by pilot control of the wheel-spring device in such a manner that an influence of the disturbance on the wheel-spring device is at least partly compensated.

The system takes advantage of the circumstance, typical of the agricultural sector, for example, that in the case of field cultivation one and the same point of the field or of peripheral access paths and access areas is driven across repeatedly at comparatively short time-intervals by reason of a large number of successive cultivation steps. The storage of the data pairs therefore makes it possible to perform a mapping of the disturbances and to provide for improving the ride comfort as well as the ground contact of the off-road utility vehicle by appropriate pilot control of the wheel-spring device. The mapped disturbances in this case ultimately represent the condition or qualities of the ground surface being driven along as regards ground irregularities, undulations, furrows, potholes and such like.

The off-road utility vehicle may be, for example, an agricultural tractor equipped with a front axle having individual wheel suspension so that a total of two of the wheel-spring devices are provided. For each of the two wheel-spring devices a wheel-specific ascertainment and storage of associated data pairs can be undertaken. Deviating from this, the agricultural tractor may also exhibit a sprung swing axle, in which case the ascertainment of the data pairs is then carried out not in wheel-specific manner but in axle-oriented manner.

The wheel-spring device is of conventional design and includes a hydraulic spring strut which extends between a wheel suspension link, swivel-mounted on a vehicle chassis, or an axle body of the swing axle, on the one hand, and a linking point provided on the vehicle chassis on the other hand. A hydraulic piston partitions a hydraulic cylinder encompassed by the hydraulic spring strut into an annular chamber and a piston chamber. The annular chamber and the piston chamber communicate with one another via a throttle valve which is adjustable with respect to its resistance to flow so that the damping characteristic of the hydraulic spring strut can be varied. A pressure control valve further permits an adaptation of the working pressure and hence of the suspension characteristic of the hydraulic spring strut. Both the throttle valve and the pressure valve exhibit associated electrically controllable adjusting elements which permit the control unit to influence the resistance to flow or the working pressure of the hydraulic spring strut for the purpose of adapting the damping characteristic or suspension characteristic.

It should be noted that use of the system is not restricted to the agricultural sector; rather, this system can be employed just as well also in road construction or the like.

The derived quantity may be a category allocated to the respective disturbance. By categorizing the disturbance, it is possible for the data-processing effort in connection with the drive of the wheel-spring device to be reduced further in which connection categories such as "driving along an uneven ground", "driving along an undulating ground", "driving across a deep furrow", "fast driving across a pothole", "slow driving across a pothole" are conceivable. The existence of a certain category in this connection can be ascertained by the control unit on the basis of an amplitude and frequency analysis of the captured force profile. The assessment of the speed of locomotion of the off-road utility vehicle is undertaken in a known manner by evaluating the wheel speeds captured by means of associated wheel-speed sensors.

The sensor means may be a pressure sensor for capturing a working pressure existing in a hydraulic spring strut of the wheel-spring device. From the working pressure captured by sensor means, the control unit ascertains the force acting on the wheel-spring device as well as the profile thereof over time, taking as a basis the known piston cross-section of the hydraulic spring strut.

It should be noted at this point that the ascertainment of the force profile may also be undertaken by using an acceleration sensor assigned to the wheel-spring device, in which case the acceleration sensor measures a vertical acceleration arising on the vehicle chassis in the region of the wheel-spring device.

Moreover, the navigation means may be a satellite-aided GPS navigation system. For the purpose of increasing the accuracy of the position data made available by the GPS navigation system, the latter may also take the form of a so-called real-time navigation system operating in accordance with the RTK (real-time kinematic) method. The mode of operation of said method is based on carrier-phase measurements of received GPS satellite signals, whereby correction data having an accuracy within the centimeter range are transmitted to the GPS navigation system in real time from a stationary reference station which, for example, has been installed at the edge of a field to be cultivated. As a general rule, a GPS navigation system of such a type is present, in particular, in the case of agricultural tractors having autonomous steering so that the cost-effective concomitant use thereof is possible.

In this connection there is the possibility that the control unit deletes the data pair saved in the memory unit upon expiration of a predetermined storage-time. For this purpose, the data pair can be provided with a time-stamp by the control unit, the storage-time that begins with the setting of the time-stamp having been predetermined in such a manner that an erroneous drive of the wheel-spring device by reason of significant changes in the condition of the ground surface being driven along that have occurred in the meantime can be largely ruled out.

In addition, a variable presetting of the storage-time by the control unit as a function of the meteorological conditions is conceivable. Accordingly, the storage-time should be shortened appropriately if considerable changes in the condition of the ground surface being driven along are to be expected by reason of heavy rain, storms or the like. The meteorological data required for this purpose can be received by means of, for example, a VHF radio located in the off-road utility vehicle, and made available to the control unit.

Additionally or alternatively, the control unit can update the data pair saved in the memory unit upon renewed crossing of the disturbance, particularly in the case where said control unit establishes that by reason of changes in the condition of the ground surface being driven along that have occurred in the meantime, the influence of the disturbance on the wheel-spring device is only being compensated inadequately. Whether this is the case is detected by the control unit by evaluation of the force profile ascertained in this respect upon renewed crossing of the disturbance.

The control unit can additionally transmit the data pair to a central database for the purpose of storage, in which case the transmitted data pairs can be made available in mapped and anonymized form to further users. Conversely, a reception of the data pairs transmitted to the central database by other users is also conceivable.

In the simplest case, the transmission can be undertaken in wireless manner by means of a GSM network, for which purpose the control unit communicates with the central database via a GSM interface.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein:

The FIGURE shows a schematic of an exemplary embodiment of a system for predictive chassis control for an off-road vehicle.

DETAILED DESCRIPTION

The system 10 is an integral part of an off-road utility vehicle which is not represented in any detail and which in the present case is an agricultural tractor equipped with a front axle 12 having individual wheel suspension. The front axle 12 exhibits steerable front wheels 14 to which wheel-spring devices 16 which are controllable with respect to their damping characteristic or suspension characteristic are assigned. For reasons of clarity, only one of the wheel-spring devices 16 has been reproduced in the FIGURE. This device is supplied by means of a compressor 18 with hydraulic fluid from a central reservoir 20 of a hydraulic system of the agricultural tractor.

The wheel-spring device 16 is of conventional design and exhibits a hydraulic spring strut 22 which extends between a wheel suspension link 26, which is swivel-mounted on a vehicle chassis 24, and a linking point 28 provided on the vehicle chassis 24.

A hydraulic piston 30 partitions a hydraulic cylinder 32 encompassed by the hydraulic spring strut 22 into an annular chamber 34 and a piston chamber 38 connected to a membrane reservoir 36. The annular chamber 34 and the piston chamber 38 communicate with one another via a throttle valve 40 which is adjustable with respect to its resistance to flow. A pressure control valve 44 taking the form of a 4/3-way valve 42, with a blocking central position, further permits an adaptation of the working pressure. Both the throttle valve 40 and the pressure control valve 44 exhibit associated electrically controllable adjusting elements 46, 48, so that the resistance to flow or the working pressure of the hydraulic spring strut 22 and hence the damping characteristic or suspension characteristic of the wheel-spring device 16 can be influenced by a control unit 50.

A sensor means 54 taking the form of a pressure sensor 52 serves for capturing the working pressure existing in the piston chamber 38 of the hydraulic spring strut 22. From the operating pressure captured by sensor means, the control unit 50 ascertains the force acting on the wheel-spring device 16 as well as the profile F(t) thereof over time t, taking as a basis the known piston cross-section of the hydraulic spring strut 22.

Additionally or alternatively, the ascertainment of the force profile F(t) is undertaken by using an acceleration sensor 56 assigned to the wheel-spring device 16, in which case the acceleration sensor 56 measures a vertical acceleration arising on the vehicle chassis 24 in the region of the wheel-spring device 16.

Moreover, a navigation means 60 taking the form of a satellite-aided GPS navigation system 58 is present. This navigation means serves for ascertaining a current geoposition of the agricultural tractor in the form of associated position data.

For the purpose of increasing the accuracy of the position data made available by the GPS navigation system 58, said system takes the form of a so-called real-time navigation system operating in accordance with the RTK (real-time kinematic) method. The mode of operation of said method is based on carrier-phase measurements of received GPS satellite signals, whereby correction data having an accuracy within the centimeter range are transmitted to the GPS navigation system 58 in real time from a stationary reference station 62 which, for example, has been installed at the edge of a field to be cultivated.

A disturbance 66 acting on the wheel-spring device 16 via the associated front wheel 14, depending upon the condition of the ground surface 64 being driven along, results in a corresponding temporal alteration of the working pressure existing in the piston chamber 38 of the hydraulic spring strut 22, or of the vertical acceleration arising on the vehicle chassis 24 in the region of the wheel-spring device 16. The force profile F(t) brought about in such a way by reason of the disturbance 66, inclusive of the position data corresponding thereto, is saved by the control unit 50 as a data pair in a memory unit 68. The ascertainment and storage of the data pairs are undertaken in this connection in wheel-specific manner for each of the two wheel-spring devices 16.

In the case where the agricultural tractor exhibits a sprung swing axle instead of a front axle 12 having individual wheel suspension, the ascertainment of the data pairs is undertaken not in wheel-specific manner but rather in axle-oriented manner.

According to an optional configuration of the system 10, instead of the ascertained force profile F(t) the control unit 50 saves a quantity derived therefrom in the memory unit 68. The derived quantity is a category allocated to the disturbance 66, in which connection, amongst other things, the categories "driving along an uneven ground", "driving along an undulating ground", "driving across a deep furrow", "fast driving across a pothole", "slow driving across a pothole" are provided. The presence of a certain category in this connection is determined by the control unit 50 on the basis of an amplitude analysis or frequency analysis of the ascertained force profile F(t). The assessment of the speed of locomotion of the agricultural tractor is undertaken in known manner by evaluation of the wheel speeds captured by means of associated wheel-speed sensors 70.

If the control unit 50 detects an imminent renewed crossing of the disturbance 66 by continuous reconciliation of the current geoposition of the agricultural tractor made available by the GPS navigation system 58 with the position data saved in the memory unit 68, the control unit adapts the damping characteristic or suspension characteristic of the wheel-spring device 16 on the basis of the force profile F(t) saved in the memory unit 68 or on the basis of the category allocated thereto by pilot control of at least one of the two adjusting elements 46, 48 in such a manner that the influence of the disturbance 66 on the wheel-spring device 16 is at least partly compensated.

In addition, the control unit 50 transmits the data pair to a central database 72 for the purpose of storage so that said data pair can be made available in mapped and anonymized form to further users 74, 76. The transmission is undertaken in wireless manner by means of a GSM network 78, for which purpose the control unit 50 is in communication with the central database 72 via a GSM interface 80. At the same time, said database permits a reception of data pairs that are transmitted to the central database 72 by the other users 74, 76.

The control unit 50 deletes the data pair saved in the memory unit 68 upon expiration of a predetermined storage-time. For this purpose, the data pair is provided with a time-stamp by the control unit 50. The storage-time that begins with the setting of the time-stamp is predetermined by the control unit 50 in such a manner that an erroneous drive of the wheel-spring device 16 by reason of significant changes in the condition of the ground surface 64 being driven along that have occurred in the meantime can be largely ruled out. In this connection, the storage-time lies within the range of a few days.

The presetting of the storage-time by the control unit 50 is undertaken variably. Accordingly, the storage-time is shortened appropriately if considerable changes in the condition of the ground surface 64 being driven along are to be expected by reason of heavy rain, storms or such like. The meteorological data required for this purpose are received by means of a VHF radio 82 located in the agricultural tractor, and made available to the control unit 50.

In addition, the control unit 50 updates the data pair upon renewed crossing of the disturbance 66 in the case where said control unit establishes that the influence of the disturbance 66 on the wheel-spring device 16 is only being compensated inadequately by reason of changes in the condition of the ground surface 64 being driven along that have occurred in the meantime. Whether this is the case is detected by the control unit 50 by evaluation of the force profile F(t) ascertained in this respect upon renewed crossing of the disturbance 66. At the same time, the data pair updated in such a way is provided with a new time-stamp by the control unit 50.

While embodiments incorporating the principles of the present disclosure have been described hereinabove, the present disclosure is not limited to the described embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A system for predictive chassis control for an off-road utility vehicle driven on a ground surface, comprising:
    a first wheel-spring device controllable with respect to a damping or suspension characteristic, the first wheel-spring device being coupled to a first wheel of the off-road utility vehicle;
    a second wheel-spring device controllable with respect to a damping or suspension characteristic, the second wheel-spring device being coupled to a second wheel of the off-road utility vehicle, the second wheel being different from the first wheel;
    a first sensor configured to ascertain a force profile of the first wheel-spring device induced by a disturbance of the ground surface that acts on the first wheel;
    a second sensor configured to ascertain a force profile of the second wheel-spring device induced by a disturbance of the ground surface that act on the second wheel;
    a navigation device configured to ascertain a current geoposition of the off-road utility vehicle in the form of an associated position data;
    a control unit and
    a memory unit;
    wherein when a first wheel disturbance acts on the first wheel, the control unit is configured to save a sensed data pair in the memory unit where the sensed data pair includes a disturbance parameter based on the force profile of the first wheel-spring device induced by the first wheel disturbance along with an associated position data for the first wheel disturbance, and the control unit is further configured to associate a first storage-time with the sensed data pair;

wherein when a second wheel disturbance acts on the second wheel, the control unit is configured to save a sensed data pair in the memory unit where the sensed data pair includes a disturbance parameter based on the force profile of the second wheel-spring device induced by the second wheel disturbance along with an associated position data for the second wheel disturbance, and the control unit is further configured to associate a second storage-time with the sensed data pair;

wherein the control unit is further configured to detect an imminent renewed crossing of any disturbances stored in the memory unit by continuous reconciliation of the current geoposition received from the navigation device of the off-road utility vehicle with the saved position data;

wherein when the control unit detects the imminent renewed crossing of a stored disturbance by the first wheel based on the associated position data of the sensed data pair for the stored disturbance, the control unit is configured to adapt the damping or suspension characteristic of the first wheel-spring device independent of the second wheel-spring device on the basis of the disturbance parameter of the sensed data pair for the stored disturbance using a pilot control of the first wheel-spring device in such a manner that an influence of the disturbance on the first wheel is at least partially compensated;

wherein when the control unit detects the imminent renewed crossing of a stored disturbance by the second wheel based on the associated position data of the sensed data pair for the stored disturbance, the control unit is configured to adapt the damping or suspension characteristic of the second wheel-spring device independent of the first wheel-spring device on the basis of the saved disturbance parameter of the sensed data pair for the stored disturbance using a pilot control of the second wheel-spring device in such a manner that an influence of the disturbance on the second wheel is at least partially compensated; and wherein the control unit is configured to delete any sensed data pair saved in the memory unit upon expiration of the storage-time associated with the sensed data pair.

2. The system of claim 1, wherein the disturbance parameter based on the force profile of the first or second wheel-spring device induced by the disturbance is a category allocated to the respective disturbance.

3. The system of claim 1, wherein the first sensor is a pressure sensor that captures a working pressure of a hydraulic spring strut of the first wheel-spring device; and the second sensor is a pressure sensor that captures a working pressure of a hydraulic spring strut of the second wheel-spring device.

4. The system of claim 1, wherein the navigation device is a satellite-aided GPS navigation system.

5. The system of claim 1, wherein the control unit updates the sensed data pair for a disturbance saved in the memory unit upon renewed crossing of the disturbance.

6. The system of claim 1, wherein the control unit additionally transmits the sensed data pair to a central database for the purpose of storage or receives sensed data pairs transmitted to the central database by other users.

7. The system of claim 6, wherein the transmission is undertaken in a wireless manner with the use of a GSM network.

8. An off-road utility vehicle having a system for predictive chassis control, comprising:

a first wheel-spring device coupled to a first wheel of the off-road utility vehicle;

a second wheel-spring device coupled to a second wheel of the off-road utility vehicle;

a control unit configured to control a damping or suspension characteristic of the first and second wheel-spring devices;

a first sensor configured to ascertain a force profile of the first wheel-spring device induced by a disturbance that acts on the first wheel;

a second sensor configured to ascertain a force profile of the second wheel-spring device induced by a disturbance that acts on the second wheel;

a navigation device configured to ascertain a current geoposition of the off-road utility vehicle in the form of an associated position data;

the control unit further configured to determine a disturbance parameter for an encountered disturbance based on the force profile of the first wheel-spring device when the encountered disturbance acts on the first wheel and to determine the disturbance parameter for the encountered disturbance based on the force profile of the second wheel-spring device when the encountered disturbance acts on the second wheel, and to associate a storage-time with the disturbance parameter; and a memory unit configured to store the disturbance parameter with the position data corresponding thereto as an associated data pair, and to store the storage-time associated with the disturbance parameter;

wherein the control unit is further configured to detect an imminent renewed crossing of the encountered disturbance by continuous reconciliation of the current geoposition received from the navigation device of the off-road utility vehicle with the saved position data;

wherein when the control unit detects the imminent renewed crossing of the encountered disturbance by the first wheel, the control unit is configured to adapt the damping or suspension characteristic of the first wheel-spring device independent of the second wheel-spring device on the basis of the saved disturbance parameter using a pilot control of the first wheel-spring device in such a manner that an influence of the encountered disturbance on the first wheel is at least partially compensated;

wherein when the control unit detects the imminent renewed crossing of the encountered disturbance by the second wheel, the control unit is configured to adapt the damping or suspension characteristic of the second wheel-spring device independent of the first wheel-spring device on the basis of the saved disturbance parameter using a pilot control of the second wheel-spring device in such a manner that an influence of the encountered disturbance on the second wheel is at least partially compensated;

wherein the control unit is further configured to receive meteorological data and, when changes in the condition of the ground surface are expected to affect the encountered disturbance based on the meteorological data the control unit is configured to change the storage-time associated with the associated data pair; and wherein the control unit is configured to delete the associated data pair saved in the memory unit upon expiration of the storage-time associated with the disturbance parameter.

9. The off-road utility vehicle of claim 8, wherein the storage-time is shortened when the changes in the condition of the ground surface are expected to affect the encountered disturbance due to heavy rain or storms indicated by the meteorological data.

10. The off-road utility vehicle of claim 9, further comprising a weather receiver configured to receive the meteorological data for the current geoposition of the off-road utility vehicle and provide the meteorological data to the control unit.

11. A method for predictive chassis control of an off-road utility vehicle having a first wheel-spring device coupled to a first wheel and a second wheel-spring device coupled to the second wheel, the method comprising:

when a disturbance acts on the first wheel, determining a force profile of the first wheel-spring device induced by the disturbance, where the disturbance is a condition of a ground surface being driven along by the off-road utility vehicle;

when a disturbance acts on the second wheel, determining a force profile of the second wheel-spring device induced by the disturbance, where the disturbance is a condition of the ground surface being driven along by the off-road utility vehicle;

determining a parameter based on the force profile of the first wheel-spring device when the disturbance acts on the first wheel and based on the force profile of the second wheel-spring device when the disturbance acts on the second wheel;

monitoring a current geoposition of the off-road utility vehicle using a navigation device;

recording a disturbance geoposition corresponding to the force profile induced by the disturbance;

associating a storage-time with the parameter based on the force profile induced by the disturbance;

storing the parameter based on the force profile induced by the disturbance with the disturbance geoposition and the storage-time associated with the parameter;

comparing the current geoposition received from the navigation device with the stored disturbance geoposition to detect an imminent renewed crossing of the disturbance by the off-road utility vehicle;

when the imminent renewed crossing of the disturbance by the first wheel is detected, adapting a damping or suspension characteristic of the first wheel-spring device independent of the second wheel-spring device on the basis of the stored parameter based on the force profile induced by the disturbance using a pilot control of the first wheel-spring device to at least partially compensate for an influence of the disturbance on the first wheel;

when the imminent renewed crossing of the disturbance by the second wheel is detected, adapting a damping or suspension characteristic of the second wheel-spring device independent of the first wheel-spring device on the basis of the stored parameter based on the force profile induced by the disturbance using a pilot control of the second wheel-spring device to at least partially compensate for an influence of the disturbance on the second wheel;

monitoring meteorological data;

when the meteorological data indicates changes in the condition of the ground surface that are expected to affect the disturbance, revising the storage-time associated with the parameter based on the force profile induced by the disturbance; and deleting the parameter based on the force profile induced by the disturbance, the disturbance geoposition, and the storage-time associated with the parameter upon expiration of the storage-time associated with the parameter.

12. The method of claim 11, wherein revising the storage-time comprises shortening the storage-time associated with the parameter based on the force profile induced by the disturbance when the meteorological data indicates heavy rain or storms that are expected to change the condition of the ground surface and the disturbance.

* * * * *